Dec. 10, 1968 E. N. TAYLOR 3,416,004
TEMPERATURE STABLE TRIGGER CIRCUIT HAVING ADJUSTABLE
ELECTRICAL HYSTERESIS PROPERTIES
Filed Aug. 8, 1966 2 Sheets-Sheet 1

INVENTOR
ELMER N. TAYLOR,
BY
E. H. Oberheim
AGENT.

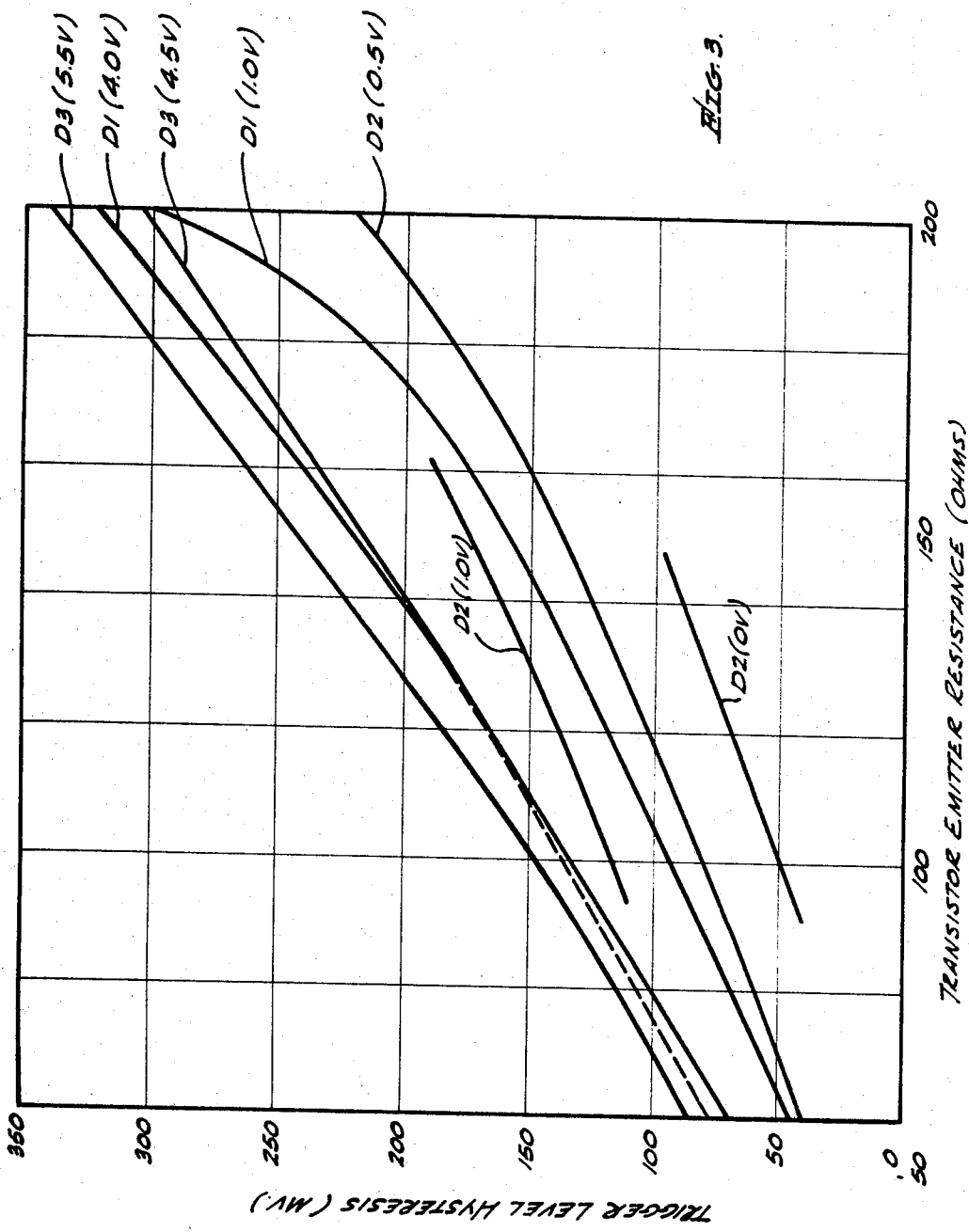

United States Patent Office 3,416,004
Patented Dec. 10, 1968

3,416,004
TEMPERATURE STABLE TRIGGER CIRCUIT HAVING ADJUSTABLE ELECTRICAL HYSTERESIS PROPERTIES
Elmer N. Taylor, Escondido, Calif., assignor to Hughes Aircraft Company, Culver City, Calif., a corporation of Delaware
Filed Aug. 8, 1966, Ser. No. 570,912
2 Claims. (Cl. 307—235)

ABSTRACT OF THE DISCLOSURE

A two-stage trigger circuit having a differential input stage for compensating temperature response and having an amplifier stage including a voltage divider network, part of which is coupled in the amplifier stage and is used to control the electrical hysteresis of the trigger circuit.

---

This invention relates generally to trigger circuits or signal level detector circuits, and more particularly to trigger circuits having inherent electrical hysteresis properties and producing DC output voltages of differing magnitudes depending upon the magnitude, polarity and past history of the input voltage.

Schmitt-type trigger circuits exhibit electrical hysteresis properties. Transistorized versions of these trigger circuits are commonly of the configuration of two stage amplifiers in which the transistors, which may be of the n-p-n variety, are connected in common emitter configuration. In these circuits the output voltage is normally at one of two DC voltage levels depending upon the instant magnitude and polarity of the input voltage in relation to the upper trigger potential or lower trigger potential of the input circuit in reference to the immediately previous magnitude of the input voltage.

In one Schmitt-type trigger circuit using n-p-n transistors fixed values of resistance are usually employed in the first stage to second stage coupling network. A fixed value of resistance is also usually used as the common emitter resistor. This resistive coupling establishes a fixed value of electrical hysteresis. Frequently, a resistive input electrical divider circuit is employed in the base circuit of the input or first stage transistor to control the trigger point or the potential at which the circuit responds to the input voltage.

Where ambient temperature excursions are minimal and the noise level in the input voltage is within acceptable limits, the circuit responds to the input voltage to produce a DC output voltage. Peak-to-peak random noise levels in excess of that for which the hysteresis adjustment of the circuit has been made can cause the circuit to "chatter," that is, switch randomly in the presence of such noise signals. Additionally, the required trigger potential may drift in changing ambient temperature environments. Some applications require the application of a trigger circuit in environments where the ambient temperature undergoes relatively wide excursions and in which the noise level on the signal being detected varies randomly in such a way as to require occasional adjustment of the electrical hysteresis of the trigger. For such applications conventional trigger circuits of the type described hereinabove are inadequate. The trigger potential required to operate the circuit drifts in changing ambient temperature environments and the circuit exhibits a tendency to switch randomly in the presence of differing peak-to-peak random noise levels.

One object of this invention is to provide an improved trigger circuit which is relatively temperature stable.

Another object of this invention is to provide an improved circuit having electrical hysteresis properties in which the electrical hysteresis of the circuit is easily adjustable.

A specific object of this invention is to provide an improved circuit for detecting signal levels, which has adjustable hysteresis properties and which is relatively temperature stable.

The aforesaid and other objects and advantages are achieved in a trigger circuit according to this invention having at least two electrical stages, one an input stage and the second an amplifier stage. The input stage comprises a differential circuit for compensating temperature response. The input stage is resistively coupled to the amplifier stage. A network including an adjustable resistive-type voltage divider network is electrically coupled to one of the main electrodes of the active element (transistor) of the amplifier stage, has a control connection coupled to the input stage to change the input threshold required for triggering, and provides a facility affording convenient adjustment of the electrical hysteresis of the circuit. The amplifier stage may be directly connected to any applicable load circuit including a further amplifier or power output stage which may be used to drive a suitable indicator having instrumentalities for indicating or displaying the condition of the input signal and/or some physical condition which such input signal represents.

The invention will be better understood by reference to the following detailed description when considered in conjunction with the accompanying drawings in which:

FIG. 3 is a graph of the trigger level voltage expressed in millivolts plotted against transistor emitter resistance expressed in ohms.

Figure 1:
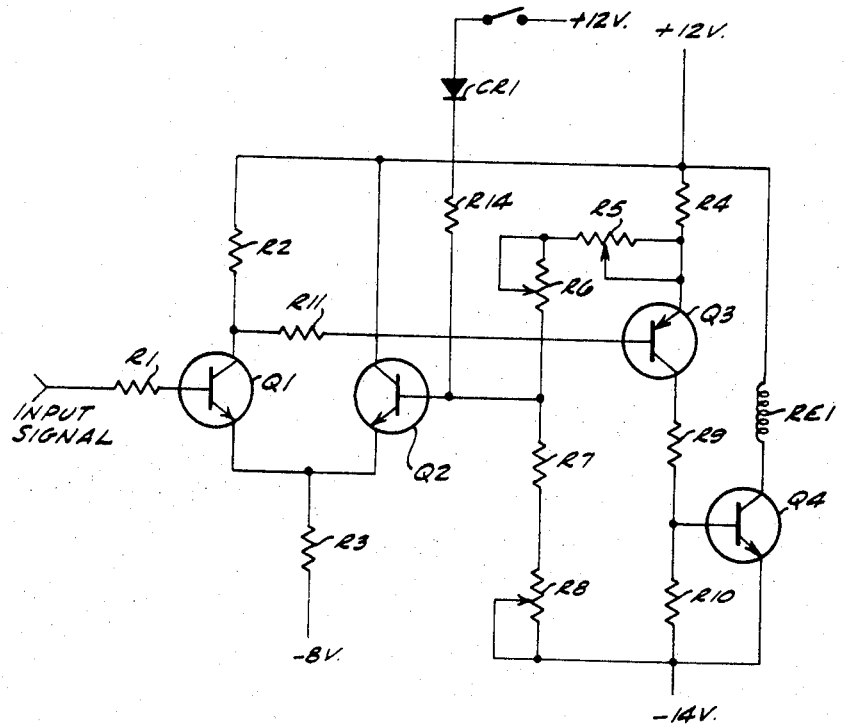
FIG. 1 is a circuit diagrammatically illustrating a trigger circuit embodying the principles of this invention.

In FIG. 1 the input stage of the trigger circuit is temperature compensated and to this end comprises a pair of n-p-n type transistors connected in common emitter configuration. The transistors are designated Q1 and Q2, respectively. The common emitter circuits of the transistors Q1 and Q2 are coupled to a predetermined negative voltage, here indicated as −8 volts, by means of a coupling resistor R3. The collector of transistor Q1 is coupled through a resistor R2 to a source of positive voltage, here designated +12 volts. The collector of transistor Q2 is coupled directly to this positive 12 volt supply. The input circuit to the input stage is the base of the transistor Q1. Input signals may be coupled directly to this base or may be coupled through a small resistor R1 as indicated.

A coupling resistor R11 couples the collector of transistor Q1 which is the output circuit of the input stage to the base circuit of a p-n-p switching transistor Q3, comprising the second stage of the trigger circuit. This transistor is switched between a saturated conducting condition and an off or nonconducting condition. The main electrodes of switching transistor Q3, that is, the emitter and collector electrodes, are coupled in series in a series resistor circuit between +12 volts and −14 volts, as indicated, by means of a resistor R4 coupled between +12 volts and the emitter of transistor Q3 and resistors R9 and R10 coupled in series between the collector electrode of transistor Q3 and −14 volts.

The base circuit of transistor Q2 of the differential pair of transistors of the input stage is coupled at a predetermined point in a voltage divider network comprising potentiometer R5, a trim potentiometer R6, a fixed resistor R7 and a trim potentiometer R8, coupled in series between the emitter of switching transistor Q3 and −14 volts as indicated. The trim potentiometers R6 and R8 set the voltage divider ratios so that the potentiometer R5 may function alone to adjust the base voltage of the transistor Q2 of the input stage between preset minimum and maximum values, depending upon the circuit parameters. This adjusts the trigger point or potential of the circuit.

An override circuit including a rectifier CR1 and a resistor R14 in series therewith is coupled to the base of the transistor Q2. When switch S1 is closed +12 volts is coupled to the anode of rectifier CR1. The rise in emitter potential resulting from this state of conduction of the transistor Q2 prevents conduction of the transistor Q1, regardless of the voltage of the input signal within the design range.

The DC output of the trigger circuit is tapped from the point between the resistors R9 and R10 in the main electrode circuit of the switching transistor Q3. This DC output voltage may be utilized in any manner desired. In a particular application of this circuit, the output voltage was coupled into the base circuit of a relay driver transistor Q4 of the n-p-n variety, the main electrode circuit of which is coupled between +12 volts and −14 volts as indicated and includes the coil RE1 of a relay, not shown, in series therewith. Whenever the transistor Q3 is conducting at saturation most of the collector current will flow through the base circuit of the relay driver transistor Q4 because the base-emitter resistance of transistor Q4 at saturation is much less than the value of the resistance of resistor R10. This current saturates the transistor Q4 which energizes the relay coil to operate the relay.

Typical types of transistors and the values of the passive circuit elements for the circuit of FIG. 1 are listed hereinbelow:

Transistors

| | |
|---|---|
| Q1 and Q2 | Type 2N2712 |
| Q3 | 2N3638 |
| Q4 | 2N696 |

Resistors

| | |
|---|---|
| R1 | 10K |
| R2 | 10K |
| R3 | 3.3K |
| R4 | 100Ω(D1) |
| R5 | 15K |
| R6 | 20K |
| R7 | 18K |
| R8 | 20K |
| R9 | 10K |
| R10 | 3.3K |
| R11 | 1K |
| R12 | 3.3K |
| R13 | 22K |
| R14 | 10K |

With reference to the foregoing it will be seen that the input stage comprising the differentially connected transistors Q1 and Q2 functions as a differential amplifier which compares the input voltage at the base of transistor Q1 with the adjustable reference voltage at the base of transistor Q2, the latter being derived as described hereinabove from the voltage divider network comprising the potentiometers R5, R6, R8 and the resistor R7. For the indicated circuit voltages and component parameters the trim potentiometers R6 and R8 set the voltage ratios in the voltage divider network so that adjustment of potentiometer R5 for the specific application varies the voltage coupled to the base of transistor Q2 between zero volts and +5 volts DC. In the base circuit of the transistor Q1 the resistor R1 limits the saturated base current of the transistor.

For any setting of the voltage divider network based upon the parameters listed hereinabove, the transistor Q2 is biased to conduct and the switching voltage level required at the input to the transistor Q1 will depend upon the setting of the voltage divider network. This determines the reference voltage level. When the input signal coupled to the base of transistor Q1 rises to that voltage required by the reference voltage level the input transistor Q1 begins to conduct. This causes a pull-down of its collector voltage due to current flow through the resistor R2 coupled in this collector circuit. For the parameters chosen a collector drop of approximately 600 millivolts is required before the second stage switching transistor Q3 turns on. The coupling resistor R11 limits the base current drawn by the switching transistor Q3 when it conducts. When the switching transistor Q3 is saturated in conduction its collector current is approximately 2 milliamperes. The base-emitter impedance of the relay driver transistor Q4 is much less than the resistor R10 in parallel with this electrode circuit. Thus, most of this 2 milliampere current flows in the base-emitter circuit of the transistor Q4 causing it to reach saturation in conduction to energize the relay coil RE1.

Since the voltage divider network comprising resistance elements R5 through R8 is coupled to the emitter of the p-n-p switching transistor Q3, whenever the switching transistor Q3 turns on, the current through the emitter resistor R4 pulls down the emitter voltage. This lowers the reference voltage applied to the base of transistor Q2 of the differential amplifier. The input signal must now drop below this new lower reference before the trigger circuit will switch and change conducting state. By this expedient electrical hysteresis has been introduced as an inherent functional property of the circuit.

Good first order predictions of electrical hysteresis are easily obtained from an analysis of the circuit values. These can be set to any value, for example, within a range of zero millivolt to 200 millivolts, for the circuit parameters indicated by simply changing the value of the resistor R4 in the emitter circuit of the switching transistor Q3.

Figure 2:
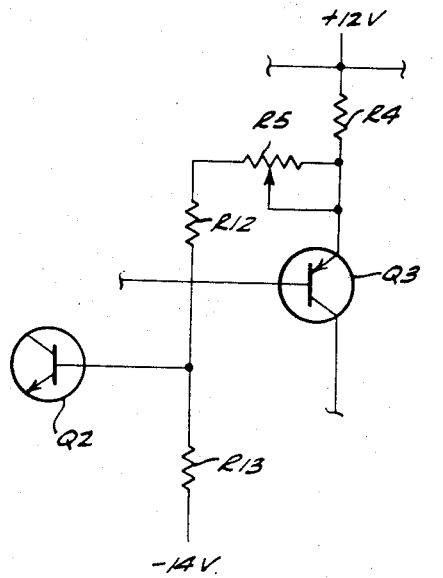
FIG. 2 is a circuit diagrammatically illustrating a portion of the circuit of FIG. 1 and depicting a second embodiment of this invention.

In this connection the resistor R4 produces a similar function in the modified circuit of FIG. 2 and functions alone to adjust the hysteresis of the circuit. Here, fixed resistors R11 and R12 are connected in series with the potentiometer R5 between the emitter of the switching transistor Q3 and −14 volts. The resistors R12 and R13 are respectively of ohmic values of 3.3K and 22K and function to establish the limit of the voltage range coupled to the base of transistor Q2, achievable by adjustment of the potentiometer R5. The curves of FIG. 4 depict the plots of trigger hysteresis versus emitter resistance for different reference voltage settings determined by adjustment of the potentiometer Q5 in the voltage divider networks. Here, voltage divider potentials for three different units D1, D2 and D3 are identified. Units D1 and D3 are represented in the circuits of FIGS. 1 and 2 wherein the value of resistor R4 is 100 ohms. Unit D2 is represented in the circuit of FIG. 2 wherein the value of resistor R4 is 120 ohms. The voltage divider potentials are indicated adjacent to each of the curves in FIG. 4, the curves depicting the characteristics of the specific circuit for those particular reference potentials.

In summary it will be seen that while Schmitt-type trigger circuits exhibit electrical hysteresis characteristics, inherently providing a degree of noise immunity, these circuits do not have additional characteristics which are required for many applications. In this respect in the hysteresis adjustment of the conventional Schmitt-type trigger circuit any change in the hysteresis adjustment usually involves the simultaneous changing of two or more circuit parameters. The calculation of the amount of hysteresis achieved in any such changes is an involved process. Attempts to adjust the trigger level of a conventional Schmitt-type trigger circuit may also require simultaneous changes of up to two and perhaps more circuit parameters. Unfortunately, this adjustment may also appreciably affect the electrical hysteresis characteristic. If the trigger potential level is adjusted by means of a resistor divider at the input of a conventional Schmitt-type trigger, the base current requirement of the transistor in the circuit and the change in transistor current gain with temperature cause the circuit to change trip level with temperature. Since the Schmitt-type trigger circuits do not have balanced input circuits any change in the input transistor base-emitter voltage with temperature will also change the trip point correspondingly. On the other hand, the circuit of this invention provides an arrangement in which the trigger level using linear potentiometers is practically linearly adjustable over a voltage range limited by the circuit parameters using only one linear potentiometer. The hysteresis of the circuit is easily predictable and is easily adjusted from zero by changing a single resistance value, i.e., the ohmic value of resistor R4. By this expedient, the circuit may be adjusted for immunity to random switching, sometimes called "chatter," in the presence of different peak-to-peak random noise signals riding on the input signal, by the simple expedient of the independent adjustment of hysteresis afforded by selection of resistor R4. By use of the balanced input circuit, i.e., the differential amplifier, changes in the base emitter voltage as a function of temperature are compensated for. By this expedient the trigger potential required at one temperature would be exactly the same as the trigger potential required at a second higher or lower temperature within the compensating range afforded by the circuit parameters. Additionally, the circuit is relatively unaffected by changes in current gain with temperature since the value of the resistor R1 may be kept small, some applications actually permitting the removal of R1. Finally, the circuit response may remain fixed, even in the presence of noise, as long as the electrical hysteresis is adjusted to equal or exceed the maximum peak-to-peak noise level.

The input to a circuit of the type herein described may be any suitable electrical quantity. Typical applications requiring the improved characteristics of a circuit of this type are to be found in most instances wherein a transducer is employed to produce an electrical output as a function of some physical condition in an environment, for example, where temperature is uncontrolled and where the transducer output signal may include a noise signal of relatively large magnitude. In applications to vacuum ion gauge controls, wherein the vacuum ion gauge functions as the transducer, the DC output signal of the ion gauge may have a relatively high noise content. In such a system the trigger circuit of this invention, functioning as a level detector, is employed to actuate some auxiliary units such as a relay at an output voltage corresponding to some preselected pressure.

What is claimed is:
1. A trigger circuit having a presettable electrical hysteresis characteristic, an adjustable trigger point and temperature compensation comprising:
   a differential temperature compensating amplifier having a pair of transistors coupled in common emitter configuration and each having base and collector electrodes, one of said transistors being an input transistor and the other transistor being a reference transistor;
   a collector electrode circuit including an impedance device coupled in series with the collector of said input transistor, for coupling said collector electrodes to a supply of voltage;
   an emitter resistor for coupling said common emitters to a supply of voltage;
   an amplifier comprising a transistor having a collector, an emitter and a base;
   an impedance device for establishing the electrical hysteresis of said trigger circuit, connected to said emitter of said last-named transistor for coupling said emitter to a supply of voltage;
   impedance means for coupling said collector electrode of said last-named transistor to a supply of voltage;
   impedance means for coupling said collector electrode of said input transistor to said base of said last-named transistor;
   and a voltage divider circuit coupled to said emitter circuit of said last-named transistor and coupled to a supply of voltage, forming a circuit paralleling said last-named transistor, and having a connection with said base electrode of said reference transistor for establishing the trigger point of said trigger circuit.
2. Apparatus as set forth in claim 1 in which said voltage divider circuit comprises an adjustable impedance device for adjusting said trigger point.

References Cited
UNITED STATES PATENTS 3,256,901 6/1966 Kline _____ 330—30 D
3,316,423 4/1967 Hull _____ 307—313

JOHN S. HEYMAN, *Primary Examiner.*

U.S. Cl. X.R.

307—230, 290; 330—30